(12) United States Patent
Kronewitter, III et al.

(10) Patent No.: US 7,961,624 B2
(45) Date of Patent: Jun. 14, 2011

(54) SYSTEM AND METHOD FOR PROVIDING BANDWIDTH SIGNALING ACROSS CRYPTOGRAPHIC BOUNDARIES IN A NETWORK

(75) Inventors: Frank Dell Kronewitter, III, San Diego, CA (US); Bong K. Ryu, Poway, CA (US)

(73) Assignee: Argon ST, Fairfax, VA (US)

( * ) Notice: Subject to any disclaimer, the term of this patent is extended or adjusted under 35 U.S.C. 154(b) by 195 days.

(21) Appl. No.: 12/222,722

(22) Filed: Aug. 14, 2008

(65) Prior Publication Data
US 2009/0080460 A1 Mar. 26, 2009

Related U.S. Application Data

(60) Provisional application No. 60/935,452, filed on Aug. 14, 2007.

(51) Int. Cl.
*H04L 12/28* (2006.01)
*H04J 3/16* (2006.01)
*H04L 29/06* (2006.01)
*H04K 1/00* (2006.01)

(52) U.S. Cl. ............ 370/236; 370/395.52; 370/466; 370/468; 713/153; 726/12; 380/255

(58) Field of Classification Search .......... 370/229–235, 370/395.21, 395.41, 477, 236–236.1, 395.4–395.52, 370/466–469; 709/223–229, 235, 246, 249; 726/1–20; 713/151–181; 380/28, 255–258, 266; 342/357.2–358
See application file for complete search history.

(56) References Cited

U.S. PATENT DOCUMENTS

| 5,442,708 | A | 8/1995 | Adams et al. |
| 5,444,782 | A | 8/1995 | Adams et al. |
| 6,701,370 | B1 | 3/2004 | Dillon |
| 6,973,497 | B1 | 12/2005 | Border et al. |
| 7,606,188 | B2 * | 10/2009 | Dale et al. ............ 370/321 |
| 7,623,458 | B2 | 11/2009 | Ayyagari et al. |
| 7,706,266 | B2 * | 4/2010 | Plamondon ............ 370/230 |
| 2002/0003776 | A1 * | 1/2002 | Gokhale et al. ............ 370/236 |
| 2005/0232180 | A1 * | 10/2005 | Toporek et al. ............ 370/316 |
| 2006/0256817 | A1 | 11/2006 | Durst |
| 2007/0076599 | A1 * | 4/2007 | Ayyagari et al. ............ 370/229 |

OTHER PUBLICATIONS

Durresi et al, "Congestion Control using Multilevel Explicit Congestion Notification in Satellite Networks", IEEE, 2001.*

(Continued)

*Primary Examiner* — Aung S Moe
*Assistant Examiner* — Habte Mered
(74) *Attorney, Agent, or Firm* — Duane Morris LLP

(57) ABSTRACT

The use of Protocol Enhancing Proxies (PEPs) and HAIPE encryption has traditionally been mutually exclusive. IP-layer encryption renders the upper layers, such as TCP, unavailable to the PEP. By integrating the IP layer encryption into the modem and using additive or multiplicative increase and decrease signals as bandwidth notification, signaling is provided across the cryptographic boundary to support the use of a bandwidth aware PEP in a network protected by IP-layer encryption.

13 Claims, 4 Drawing Sheets

OTHER PUBLICATIONS

J. Ishhac & M. Allman, "On the Performance of TCP Spoofing in Satellite Networks", Milcom, 2001.

J. Postel, "RFC 792: Internet Control Message Protocol," IETF, Sep. 1981.

J. Border, et al, "RFC 3135: Performance Enhancing Proxies Intended to Mitigate Link-Related Degradations," IETF, Jun. 2001.

Satlabs, "Interoperable PEP," Nov. 2005.

NSA, "High Assurance Internet Protocol Encryptor Interoperability Specification—Networking Core", Version 3.0.0.

ETSI, "ETSI EN301 790: Digital Video Broadcasting (DBV): Interaction channel for satellite distribution systems," Mar. 2003.

ETSI, "Draft ETSI TS 102 462: Satellite Earth Stations and Systems (SES); Broadband Satellite Multimedia (BSM) Services and Architectures: QoS Functional Architecture," Mar. 2006.

N. Iuoras, T. Le-Ngoc, M. Ashour, & T. Elshabrawy, "An IP-based satellite communication system architecture for interactive multimedia services," Int. J. Satell. Commun. Network., 2003: 21:401-426.

T. Le-Ngoc, V. Leung, P. Takats, & P. Garland, "Interactive Multimedia Satellite Access Communications," IEEE Communications Magazine, Jul. 2003, pp. 78-85. Q.C.

\* cited by examiner

SYSTEM AND METHOD FOR PROVIDING BANDWIDTH SIGNALING ACROSS CRYPTOGRAPHIC BOUNDARIES IN A NETWORK

This application claims the priority of U.S. Patent Application Ser. No. 60/935,452 filed Aug. 14, 2007, the disclosure of which is incorporated by reference herein.

The present disclosure is directed to the field of computer networking, especially over high latency links such as those associated with satellite communications. This disclosure, in particular, relates to the use of cryptographic security mechanisms such as IP-layer encryptors with upper layer performance enhancing proxies over such communication links. Network environments benefiting the most from this invention will be those containing bandwidth-on-demand components.

BACKGROUND

In a communication network, hosts communicate by sending and receiving packets to each other. This communication may include many different types of physical medium including short copper wires and long geosynchronous satellite links. Network devices which transport packets typically operate transparently from the end hosts so that network devices may be added and removed without modifying the host users of the network.

It is often desirable to secure data from unauthorized persons who may be attempting to eavesdrop on the data. Defense networks may contain potentially damaging military information. Users of public networks may transmit personal or financial data which may be exploited for criminal use.

Encryption is a useful technique to provide security in a public communication network. The sender encrypts data making the data unavailable to potential interceptors and the receiver decrypts the data recovering the original message. Network encryption may occur at various levels throughout the OSI stack including link layer (layer 2), such as classic ATM encryptors; the transport layer (layer 4), such as Secure Socket Layer; or IP network layer (layer 3), such as High Assurance Internet Protocol Encryption (HAIPE). HAIPE is used by the Department of Defense and is based on Internet Protocol Security (IPsec), a standard defined by the Internet Engineering Task Force (IETF). HAIPE devices provide cryptographic isolation between private networks, referred to as secured security enclaves in the HAIPE terminology. When the data is encrypted, upper layer protocol headers such as TCP and secure enclave IP addresses are converted to cipher text and rendered unavailable in the shared transit network. Network security specialists refer to the secure network as Plain Text or red and the transit, encrypted network as Cipher Text or black.

In a network containing high latency, dynamic bandwidth links, protocol acceleration techniques have been shown to be useful, especially for TCP. One popular technique is the spoofing of network data with a protocol enhancing proxy (PEP). The PEP may employ a protocol optimized for satellite links such as Space Communication Protocol Standards Transport Layer (SCPS-TP) or Xpress Transport Protocol (XTP). For a PEP to work well over a dynamic bandwidth link, the current bandwidth available over the backbone link must be known.

Currently, the network device which knows the current bandwidth resides in the encrypted network since it must be the last device without an RF interface. However, for the PEP software to work it must have access to upper layer header information and so must reside in the unencrypted network. Thus, the PEP typically could not be used with IP layer encryptors because the PEP did not receive bandwidth information across the cryptographic boundary. Signaling the bandwidth data across the cryptographic boundary is the problem which is addressed in the current disclosure.

SUMMARY

The present disclosure provides a mechanism to improve Performance Enhancing Proxies (PEPs) when deployed with IP-layer encryptors in a dynamic bandwidth environment. The present disclosure exploits the allowed exchange of signaling across a shared transit environment to a secured network enclave boundary. In one embodiment, ECN bits which typically can be passed through from black side to red side, are used to signal bandwidth across the cryptographic boundary to provide the PEP with access to the current bandwidth available which eliminates the need for ad-hoc bandwidth probing techniques and their associated lag.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
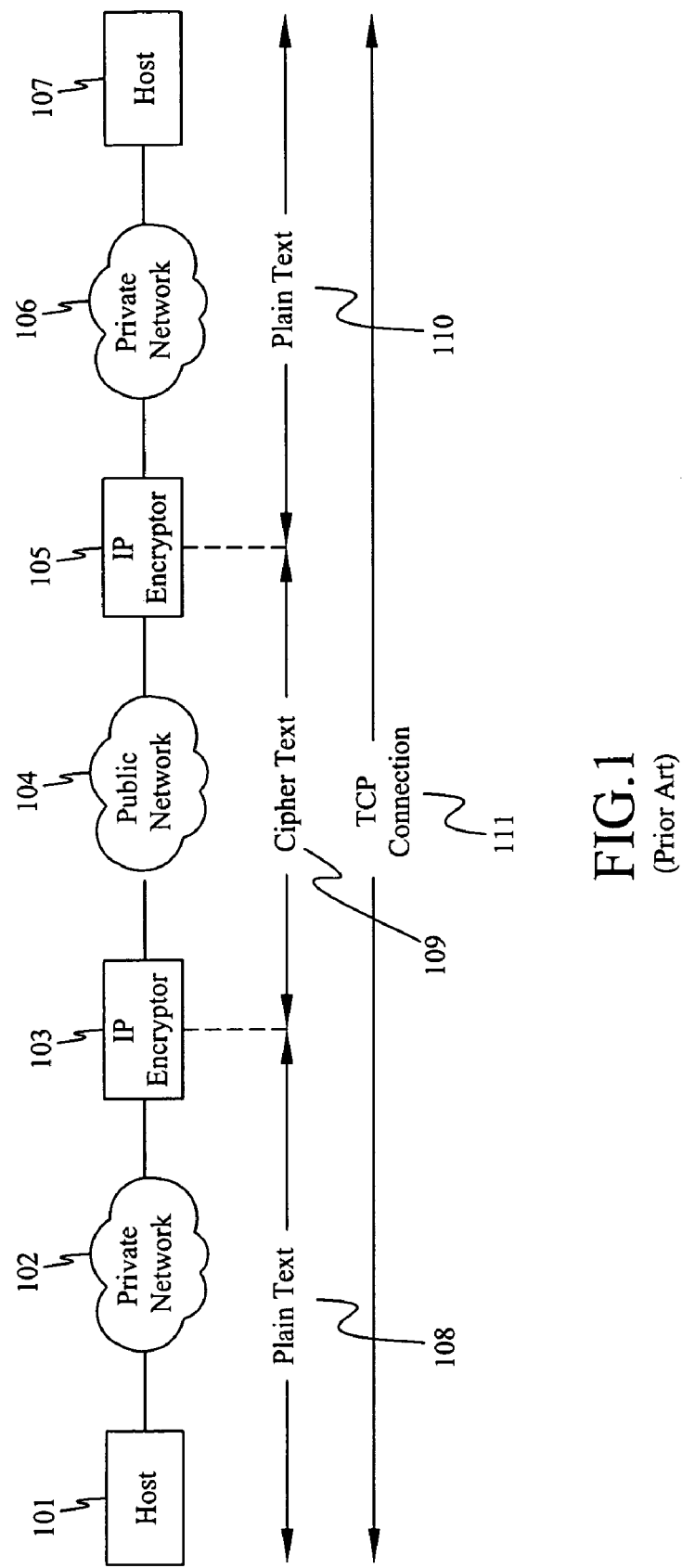
FIG. 1 is a simplified pictorial illustration of a prior art deployment of IP-layer encryptors to enable secure transmissions over an insecure or public network.

FIG. 1 illustrates IP-layer encryptors deployed to enable secure transmissions over an insecure or public network. Host 101 is a member of the private network 102. Private network 102 is connected to a public network 104 through IP-layer encryptor 103. Host 107 is a member of the private network 106. Private network 106 is connected to public network 104 through IP-layer encryptor 105. IP-layer encryptors 103 and 105 then provide secure packet communication between private networks 106 and 102 over public network 104.

Figure 2:
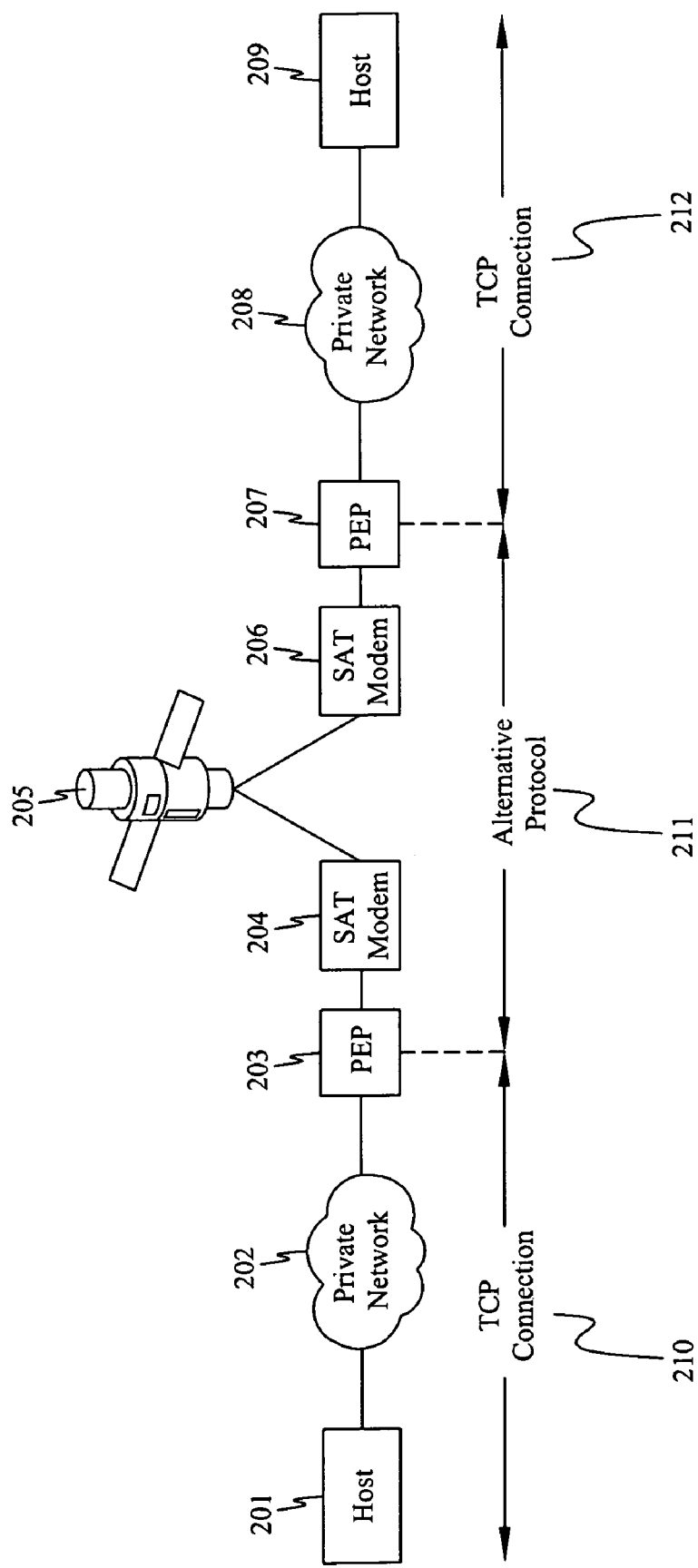
FIG. 2 is a simplified pictorial illustration of a prior art deployment of Performance Enhancing Proxies (PEPs) with a satellite link to enhance the performance of TCP connections passing through the satellite.

FIG. 2 illustrates Protocol Enhancing Proxies used to improve performance in reliable transport protocols over communication channels. Packets transmitted between hosts 201 and 209 pass through private networks 202 and 208 which are connected via satellite connection utilizing satellite 205. Satellite modems 204 and 206 provide IP layer transport for private networks 202 and 208 over satellite 205. On either side of the satellite connections a protocol enhancing proxy (PEP) is placed so that TCP packets may be translated to an alternative protocol more suitable for satellite links such as SCPS-TP or XTP. The use of a network protocol such as IP allows hosts 201 and 209 to communicate without knowledge of the structure of the underlying network. The introduction of a reliable upper layer protocol such as TCP presents some problems since 201 and 209 must exchange packet control information. By using PEPs at hosts 203 and 207, host 201 and 209 can use TCP connections 210 and 212 without knowing that a different protocol 211 is being used over the high latency satellite link. The PEPs at 203 and 207 are said to "split" the connection between hosts 201 and 209. The splitting greatly improves the performance of the TCP connection between hosts 201 and 209.

Figure 3:
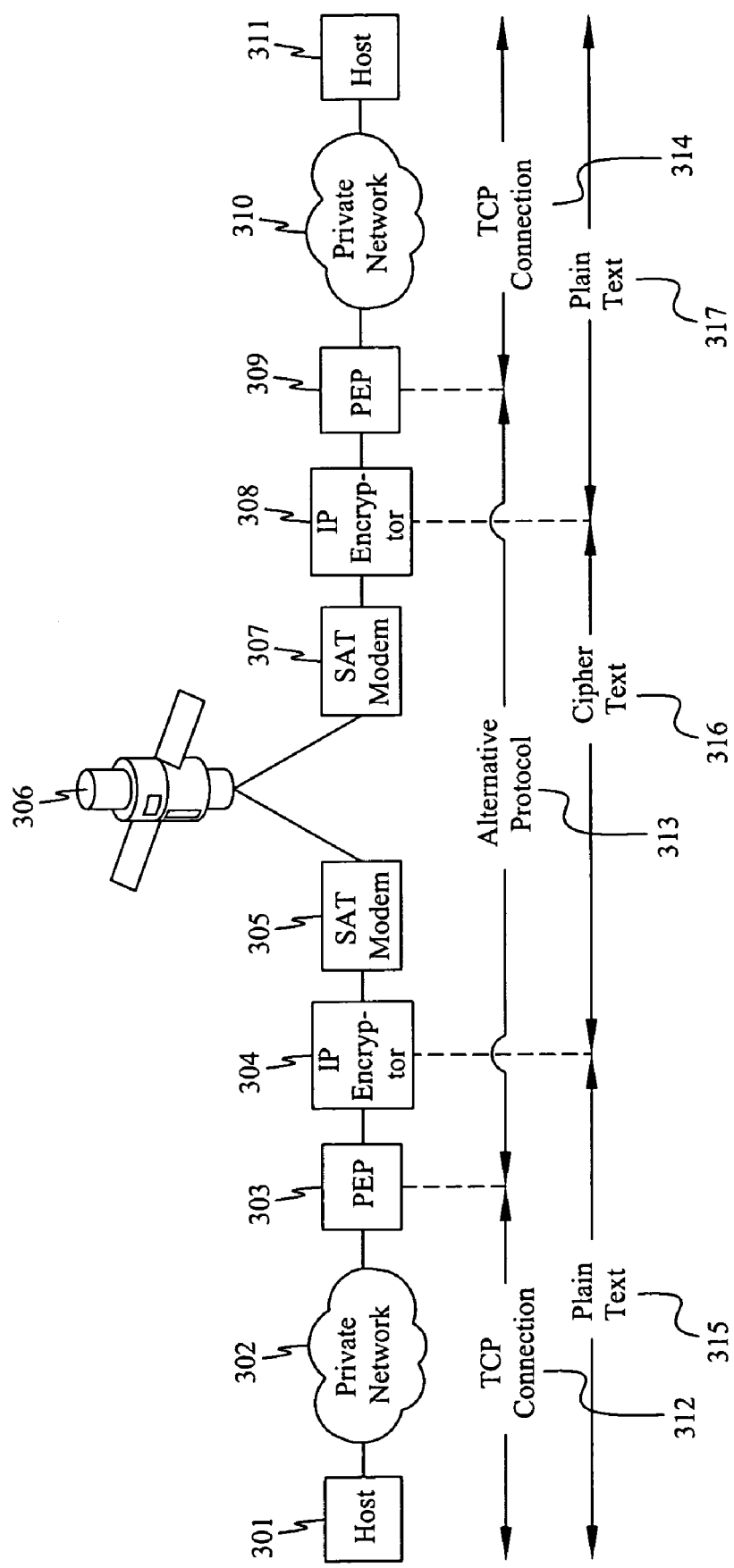
FIG. 3 is a simplified pictorial representation of a prior art deployment of Performance Enhancing Proxies (PEPs) with IP layer encryptors around a satellite link to provide secure communication and enhance the performance of TCP connections passing through the satellite.

FIG. 3 contains an example of using PEP in an IP-layer encryption environment. Hosts 301 and 311 wish to communicate securely over satellite 306 accessed via satellite modems 305 and 307. A TCP connection between hosts 301 and 311 utilizes TCP sections 312 and 314 as well as alternative protocol 313. PEP 303 lies in the plain text portion of the network 315 behind the IP-layer encryptor 304. PEP 309 also lies in the plain text portion of the network 317 behind IP-layer encryptor 308. The PEPs can be used since they lie in the plain text portion of the network and have access to TCP headers produced by hosts 301 and 311. Note that a PEP could not operate in the cipher text portion of the network 316 since TCP header would not be available. This solution works well in a static bandwidth satellite environment since the PEP may be configured with the capacity of the satellite link. However, in a dynamic bandwidth environment, the PEP in this prior art deployment has no way of getting the currently available bandwidth over the satellite connection. The PEP must use standard congestion control techniques or some other awkward solution.

U.S. Pat. App. Pub. 2006/0256817 ("Durst") has proposed two alternate solution to deploying PEPs with IP encryptors. In one solution, IP-layer encryptors are deployed around PEPs to effectively make the PEPs part of the secure network. However, such a solution requires additional IP-layer encryptors thereby increasing the overhead and may be impractical due to accessibility of the PEPs or the costs involved. In another solution, Durst suggests the use of PEP enablers to encapsulate the encrypted packet header, and build a new header to allow the PEP to use TCP on the encrypted packet. However, such a solution has the disadvantage of increased overhead in that dual PEP are required to be deployed around the IP layer encryptors.

Figure 4:
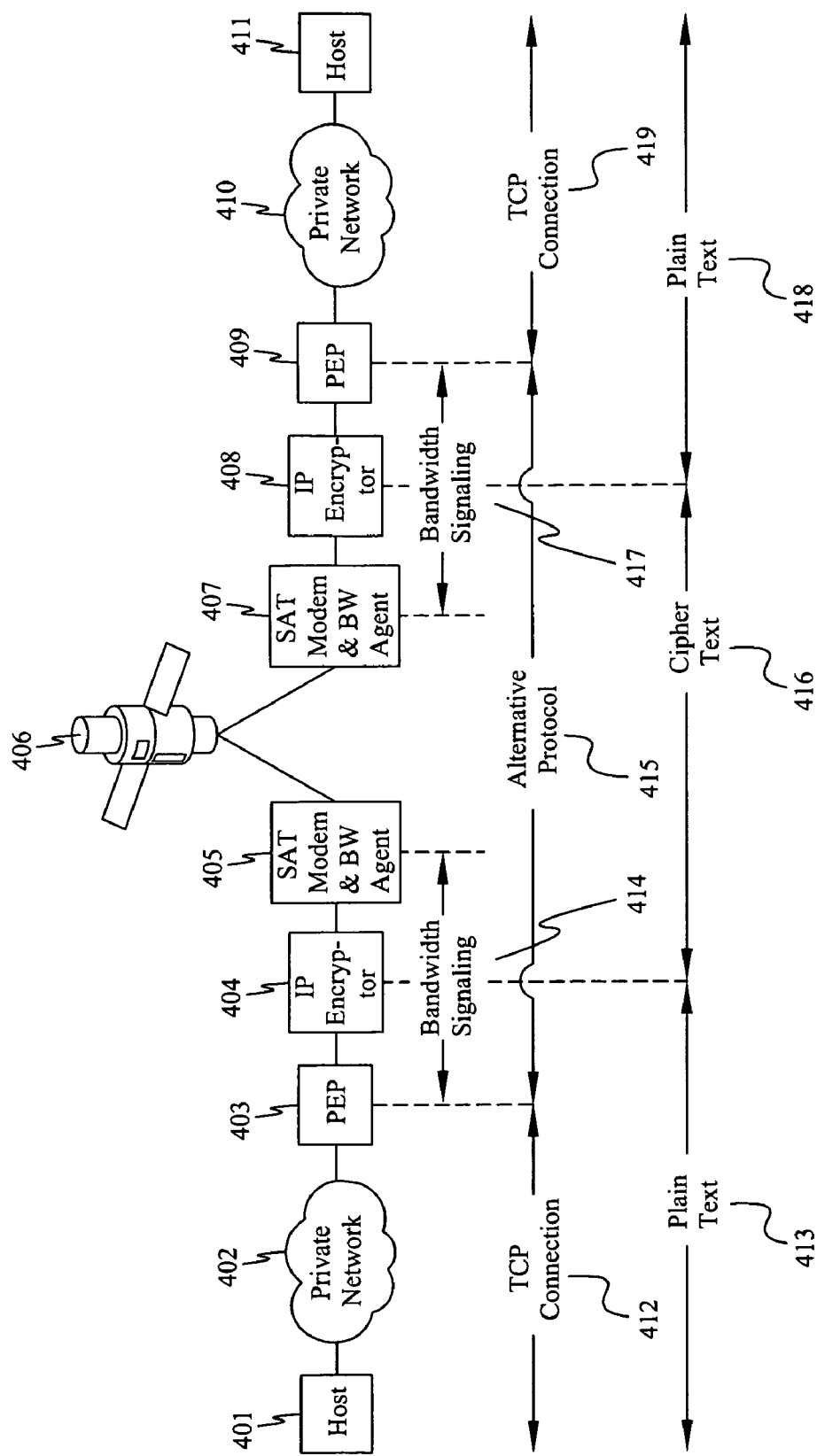
FIG. 4 is a simplified pictorial illustration of one embodiment of the present disclosure depicting the signaling occurring across the IP layer cryptographic boundary to support Performance Enhancing Proxies (PEPs) deployed with IP layer encryptors around a satellite link to provide secure communication and enhance the performance of TCP connections passing through the satellite.

FIG. 4 discloses one embodiment of a technique for signaling bandwidth across the cryptographic boundaries enabling bandwidth aware PEPs that does not require an increase in overhead as in prior art solutions.

Explicit Congestion Notification (ECN) is a known signaling technique using low bit rate transmission to provide notification of congestion. A two bit ECN field is available for transmission by IP-layer encryption devices across the cryptographic boundary. The use of ECN bits for signaling applications, such as QoS, is known as described in United States Patent App. Publication No. 20070076599.

In the present disclosure, the pre-existing ECN signaling is used to indicate the available bandwidth to the PEP. Thus, ECN is used in a way not previously contemplated or disclosed in the prior art, and allows bandwidth information to be provided to PEPs when using TCP. In one embodiment of the present disclosure, the two ECN bits are associated with four signaling levels: multiplicative increase, multiplicative decrease, additive increase, and additive decrease. The PEP maintains an estimate of the currently available bandwidth and the bandwidth agent on the black side adjusts this estimate using the ECN signaling. Since the signaling only occurs between two devices on the same side of the disadvantaged link, the signaling is not required to be robust. The use of four signaling levels is but one example, and it is contemplated that using more or less than 4 signaling levels is fully encompassed by the present disclosure.

With reference to FIG. 4, the present disclosure will be described with reference to a satellite communications system. Hosts 401 and 411 wish to communicate securely over satellite 406 accessed via satellite modems 405 and 407. A TCP connection between hosts 401 and 411 is split by PEPs in the secure network utilizing an alternative protocol over the satellite link. PEP 403 lies in the plain text portion of the network 415 behind the IP-layer encryptor 404. PEP 409 also lies in the plain text portion of the network 417 behind IP-layer encryptor 408. The PEPs can be used since they lie in the plain text portion of the network and have access to TCP headers produced by hosts 401 and 411. In a dynamic bandwidth environment the satellite modems 405 and 407 may have access to a varying amount of bandwidth depending on the amount of concurrent users of satellite 406 and the environmental factors such as rain. An effective PEP at 403 must be aware of the currently available bandwidth allocated to satellite modem 406. By using the two ECN bits contained in the IP header of traffic flowing through modem 405 toward network 402, regardless of whether the traffic destination is 401 or not, the bandwidth agent in device 405 can inform the PEP 403 of the currently available bandwidth over satellite 406. PEP 403 maintains a current estimate of the bandwidth over satellite 406 and the bandwidth agent in device 405 modifies the estimate of PEP 403 by signaling additive or multiplicative increases or decreases with the two ECN bits which are typically copied from black data entering encryptor 404 from satellite modem 405 to red data exiting encryptor 404 to the PEP 403. The bandwidth signaling occurs on the network portion 414. In this manner the PEP 403 can be informed of the current bandwidth available resulting in a more effective accelerator 403.

A similar scenario occurs with data moving from host 411 to host 401. The bandwidth agent in satellite modem 407 marks black packets destined for network 410 to signal the PEP 409 over network portion 417. PEP 409 then uses these signals to estimate the bandwidth over satellite 406.

FIG. 4 represents one embodiment of the present disclosure in the satellite environment. However, the principals of the present disclosure described herein are equally applicable to other high latency environments which make the use of TCP problematic, for example a wireless peer to peer network with intermittent connectivity.

The ECN bits may be mapped to bandwidth availability as a function of the communications environment, i.e., bandwidth requirements, latency, etc. For example, Table 1 represents a mapping in a satellite environment where a granularity of 50 kbps is sufficient.

| ECN bits | Bits | Description |
| --- | --- | --- |
| 00 | 2 | Reduce current bandwidth to 0 |
| 01 | 2 | Reduce current bandwidth level 50 kbps |
| 10 | 2 | Increase current bandwidth level 50 kbps |
| 11 | 2 | Increase current bandwidth level 100% over current level or set current bandwidth to 500 kbps if current bandwidth is 0. |

The bandwidth agent in the modem can thus inform the PEP of the currently available bandwidth over the satellite link through multiple ECN bit pattern options and updates over time. Note that an important aspect is rapid notification of large changes in available bandwidth. Thus, the selection of the granularity of the bandwidth availability is a function of the characteristic of the communication environment.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although a few embodiments have been described in detail above, other modifications are possible. Other embodiments may be within the scope of the following claims.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed:

1. A method of communicating in a communication system having a first network having a first host sourcing plain text information and a second host receiving plain text information over TCP connections, and a second network for encrypting the plain text information between the first and second host, comprising the steps of:
    (a) monitoring an available bandwidth of a satellite network in the second network via a satellite link at a bandwidth agent located in a satellite modem in the second network using a satellite congestion protocol and determining a bandwidth adjustment parameter from monitoring the available bandwidth;
    (b) formatting an IP encrypted message containing the bandwidth adjustment parameter using an ECN (Explicit Congestion Notification) protocol containing bits representing different levels of signaling by the satellite modem;
    (c) transmitting the formatted message from the second network to a performance enhancing proxy (PEP) in the first network via an IP decryption device;
    (d) translating a message formatted for the first network to a format for the second network by the PEP as a function of the bandwidth adjustment parameter,
    wherein the bandwidth adjustment parameter is used by the PEP to determine the available bandwidth for the satellite network in the second network.

2. The method of claim 1 further comprising the step of in the first network, maintaining an estimate of the available bandwidth in the second network.

3. The method of claim 1 wherein the first network utilizes TCP and the second network utilizes one of Space Communication Protocol Standards Transport Layer (SCPS-TX) and Xpress Transport Protocol (XTP).

4. The method of claim 1 wherein the ECN contains two bits representing four levels of signaling.

5. The method of claim 4 wherein the four levels of signaling comprises multiplicative increase, multiplicative decrease, additive increase, and additive decrease.

6. The method of claim 5 wherein multiplicative increase indicates increase bandwidth 100%, multiplicative decrease indicates decrease bandwidth to zero, additive increase indicates increase bandwidth 50 kbps, and additive decrease indicates decrease bandwidth 50 kbps.

7. A communication system having a first network having a first host sourcing plain text information and a second host receiving plain text information over TCP connections, and a second network for encrypting the plain text information between the first and second host, comprising:
    a protocol enhancing proxy (PEP) server in the first network for converting communications in a format for the first network to a satellite transmission format for the second network as a function of an available bandwidth of a satellite network in the second network;
    an IP encryptor in communication with the PEP for converting plain text information to encrypted information, and for converting encrypted information to plain text information;
    a bandwidth agent in a satellite modem in the second network in communication with the PEP for monitoring the available bandwidth of the satellite network in the second network via a satellite link using a satellite congestion protocol, formatting an IP encrypted message containing a bandwidth adjustment parameter in an ECN (Explicit Congestion Notification) protocol containing bits representing different levels of signaling and transmitting the formatted message from second network to the PEP via the IP encryptor for providing an indication of the available bandwidth of the satellite network in the second network.

8. The system of claim 7 wherein the PEP maintains an estimate of the available bandwidth in the second network.

9. The system of claim 7 wherein the PEP converts the communications as a function of the available bandwidth.

10. The system of claim 7 wherein the first network utilizes TCP and the second network utilizes one of Space Communication Protocol Standards Transport Layer (SCPS-TX) and Xpress Transport Protocol (XTP).

11. The system of claim 7 wherein the first and second networks are wireless networks.

12. The system of claim 7 wherein the first and second networks are wireline networks.

13. The system of claim 7 wherein one of the networks is wireline and the other network is wireless.

* * * * *